United States Patent [19]

Shirley-Elgood et al.

[11] Patent Number: 4,622,103
[45] Date of Patent: Nov. 11, 1986

[54] WATER STILL WITH A CYCLONE LIQUID-VAPOR SEPARATOR

[75] Inventors: John R. R. Shirley-Elgood, Leicester; Geoffrey A. Roulstone, Loughborough; Mahendra R. Thakkar, Leicester, all of England

[73] Assignee: Fisons plc, Ipswich, England

[21] Appl. No.: 815,301

[22] Filed: Dec. 27, 1985

Related U.S. Application Data

[63] Continuation of Ser. No. 533,059, Sep. 16, 1983, abandoned.

[30] Foreign Application Priority Data

Sep. 29, 1982 [GB] United Kingdom ................. 8227805
Mar. 11, 1983 [GB] United Kingdom ................. 8306706
Mar. 24, 1983 [GB] United Kingdom ................. 8308094

[51] Int. Cl.$^4$ .......................... B01D 3/02; C02F 1/04
[52] U.S. Cl. ................. 202/185 E; 202/197; 202/202; 55/184; 55/337; 55/447; 122/489; 203/10
[58] Field of Search ............ 202/197, 185.6, 189, 202/190, 202, 182; 203/10, 40, DIG. 17; 122/34, 488–491; 55/184–186, 337, 440, 447, 452; 210/151, 304, 320, 512.1

[56] References Cited

U.S. PATENT DOCUMENTS 3,975,241 8/1976 Smith .............................. 202/197 X
4,350,568 9/1982 Dalupan ...................... 202/185.6 X
4,417,951 11/1983 Stanisic et al. ...................... 202/197

*Primary Examiner*—Wilbur Bascomb
*Attorney, Agent, or Firm*—Marshall, O'Toole, Gerstein, Murray & Bicknell

[57] ABSTRACT

There is described a water still (1) comprising a boiler assembly (5) and a condenser assembly (3) communicating by means (7) for removing droplets from vapour.

The means comprise at least one jet, e.g. a plurality of jets (15, 17, 19, 21, 23, 25) radially disposed around a capped annulus (9), the jets capable of imparting to the droplets a spiralling motion, and urging the droplets to impinge on an interposed deflecting surface, e.g. a side wall (13) of the still (1).

Stills (1) including a heatable distillate receiver (39), a gas vent (51, 53), a level detector (69), a boiler outlet valve (59) and an improved condenser (45) are also described.

The stills described are useful for preparing water of low conductivity.

10 Claims, 6 Drawing Figures

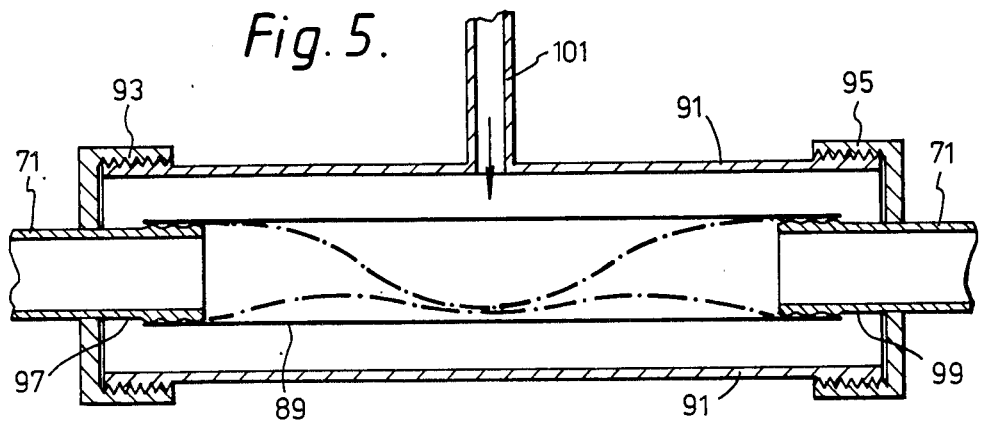
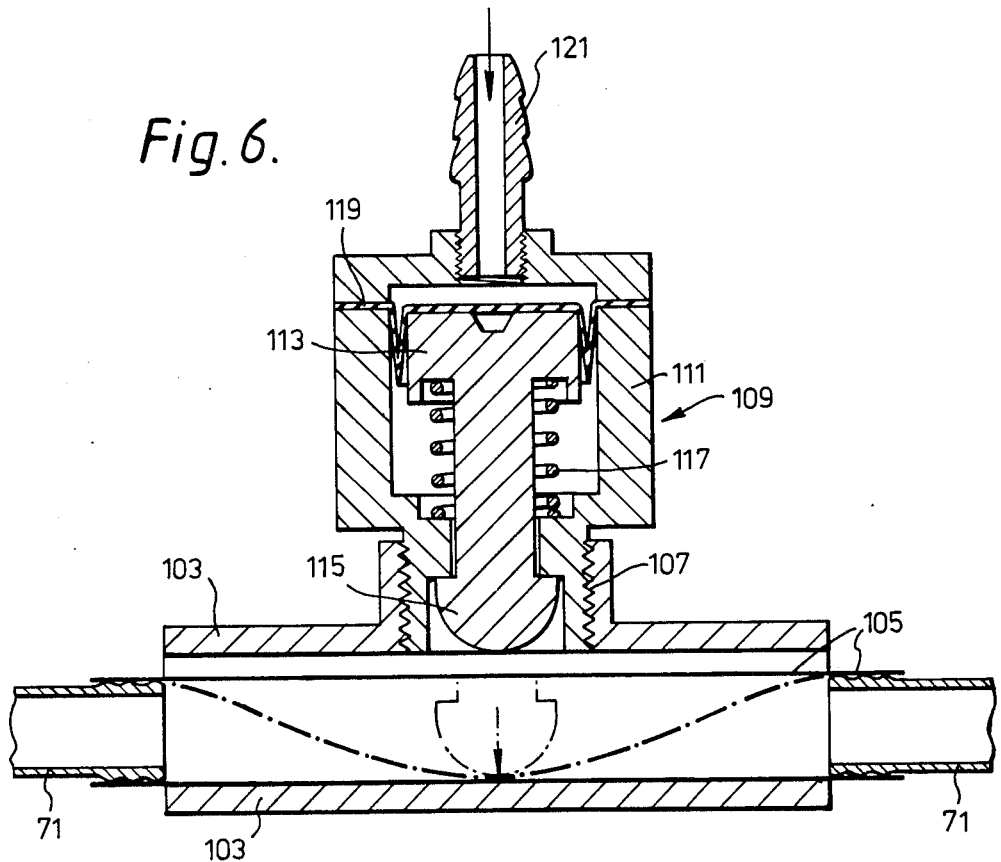

WATER STILL WITH A CYCLONE LIQUID-VAPOR SEPARATOR

This application is a continuation of application Ser. No. 533,059, filed Sept. 16, 1983 now abandoned.

This invention relates to water stills.

A large number of simple water stills are known for the preparation of distilled water which is pyrogen free.

However, the preparation of water which is both pyrogen free and has a low conductivity conventionally requires two or three distillation stages, or the use of complex and expensive equipment.

We have now found a new water still which is capable of preparing pyrogen free, low conductivity water in one distillation.

According to the invention we provide a water still including a boiler assembly and a condenser assembly communicating by means for removing droplets from vapour, wherein the means comprise at least one jet capable of imparting to droplets a spiralling motion and urging the droplets to impinge on an interposed deflecting surface.

Each jet is preferably capable of imparting an outwardly spiralling motion to the droplets.

The deflecting surface is preferably a side wall of the still.

Preferably, the means comprise a plurality of jets radially disposed in a horizontal circle. By horizontal we mean horizontal with respect to the base of the still, the condenser assembly preferably being vertically disposed above the boiler assembly.

The jets preferably are capable of urging droplets in a direction tangential to the circle. Each jet preferably includes an arcuate portion, i.e. a portion having a portion with a curve of between 45° and 135°, preferably between 60° and 120°.

We prefer the jets to be located in a capped horizontal annulus, in which the upper portion of the annulus is provided with a roof, so that the roof and the annulus comprise a cap.

According to a preferred aspect of the invention, we provide a water still including a boiler assembly and a condenser assembly communicating by means for removing droplets from vapour, wherein the means comprise a plurality of arcuate jets located on a capped horizontal annulus, the jets being capable of urging droplets in a direction tangential to the annulus in an outwardly spiralling motion to impinge on a side wall of the still.

The annulus is preferably capped by a distillate receiver, e.g. reservoir, provided with a drainage port in which the bottom of the distillate receiver provides the roof of the annulus. The drainage port is preferably located in an upper portion of the distillate receiver.

We prefer the condenser assembly to include a condenser arranged so that water which has condensed on to one portion of the condenser cannot flow to any other cooler portion of the condenser. Preferred arrangements are a condenser coil comprising a horizontal spiral conduit, or alternatively a condenser comprising a horizontal helical conduit.

The condenser is preferably provided with a gas vent comprising an elongate conduit provided with an upwardly facing aperture within the still. The aperture is preferably located adjacent the position of the condenser coil which in operation is the hottest part of the coil. In particular, we prefer the gas vent to be adjacent an outlet portion of the condenser coil.

According to a particularly preferred aspect of the invention, we provide a boiler assembly and a condenser assembly communicating by means for removing droplets from vapour, wherein the means comprise a plurality of arcuate jets located on a capped horizontal annulus, the jets being capable of urging droplets in a direction tangential to the annulus in an outwardly spiralling motion to impinge on a side wall of the still, the annulus being capped by a distillate receiver provided with a drainage port, the condenser assembly including a condenser arranged so that water which has condensed on to one portion of the condenser cannot flow to any other cooler portion of the condenser, and a gas vent comprising an elongate conduit provided with an upwardly facing aperture within the still, the aperture located adjacent the portion of the condenser which in operation is the hottest portion of the condenser.

The boiler assembly preferably includes a means for detecting a fall in the water level which comprises a thermistor, e.g. with a positive temperature coefficient and with an intrinsic switching temperature in the range 120°–200° C., e.g. 140°–160° C. which self heats when a voltage is applied to it.

We prefer the thermistor to be mounted in a probe located at a desired low water level in the boiler assembly. The thermistor is preferably provided with a concentrically mounted protective skirt.

In a boiler assembly including a constant level device and a boiler vessel, the thermistor may be located in the boiler vessel. However, we prefer the thermistor to be located in the constant level device. When the thermistor is located in the constant level device, we prefer it to be mounted in an adjustable screw assembly, so that the detected low water level may be altered as required.

When the boiler assembly includes a water inlet and a water outlet, we prefer the water outlet to be provided with a pressure actuated valve, the valve comprising a rigid envelope enclosing a flexibly resilient conduit communicating with the outlet, the envelope communicating with the inlet, the resilient conduit being capable of reversible closure when inlet water pressure communicated to the envelope is greater than water pressure within the conduit.

The flexibly resilient conduit can be of a wide range of sizes and shapes and can be made from a range of suitable materials, e.g. natural or synthetic polymers. The conduit, preferably in the form of a tube, may have a length:internal diameter ratio of from 2:1 to 20:1, particularly from 5:1 to 15:1 and has a circular or ovoid cross-section. The conduit may be made from polyhalogenated hydrocarbons, notably polytetrafluoroethylene; however we prefer the conduit to be made from a material having a good elastic memory i.e. a material which tends to revert to its original shape. Suitable materials include silicone rubbers, natural rubbers and flexible polyvinyl chloride.

The inlet water pressure may be communicated to the envelope directly or indirectly. For example, the pressure may be communicated by an expansible member, e.g. a piston operated gate valve. When a piston operated gate valve is used, we prefer the valve to be biased towards the open position, e.g. by means of a compression spring. However, we particularly prefer the water pressure to be communicated directly to the flexibly resilient conduit.

Pressure actuated valves have the advantage that they can be constructed to seal over a comparatively large area thereby accommodating solid particles trapped in the valve without the seal being broken. This is of particular advantage in a valve for the control of a boiler outlet, since boilers frequently build up deposits of insoluble salts.

According to a further aspect of the invention, we provide a still comprising a water boiler assembly including means for detecting a fall in the water level which comprises a thermistor with an intrinsic switching temperature in the range 120°–200° C., which self-heats when a voltage is applied to it.

According to another aspect of the invention, we provide a still comprising a pressure actuated valve, for use in association with a vessel including a fluid inlet and a fluid outlet which comprises a rigid envelope enclosing a flexibly resilient conduit communicating with the outlet, the envelope communicating with the inlet, the resilient conduit being capable of reversible closure when inlet fluid pressure communicated to the envelope is greater than fluid pressure within the conduit.

An embodiment of the invention will now be described, though only by way of illustration, with regard to the accompanying drawings in which FIG. 1 is a schematic representation of a water still according to the invention;

FIG. 5 is a diagrammatic section through a pressure actuated valve according to the invention;

FIG. 6 is a diagrammatic section through an alternative pressure valve according to the invention.

Figure 1:
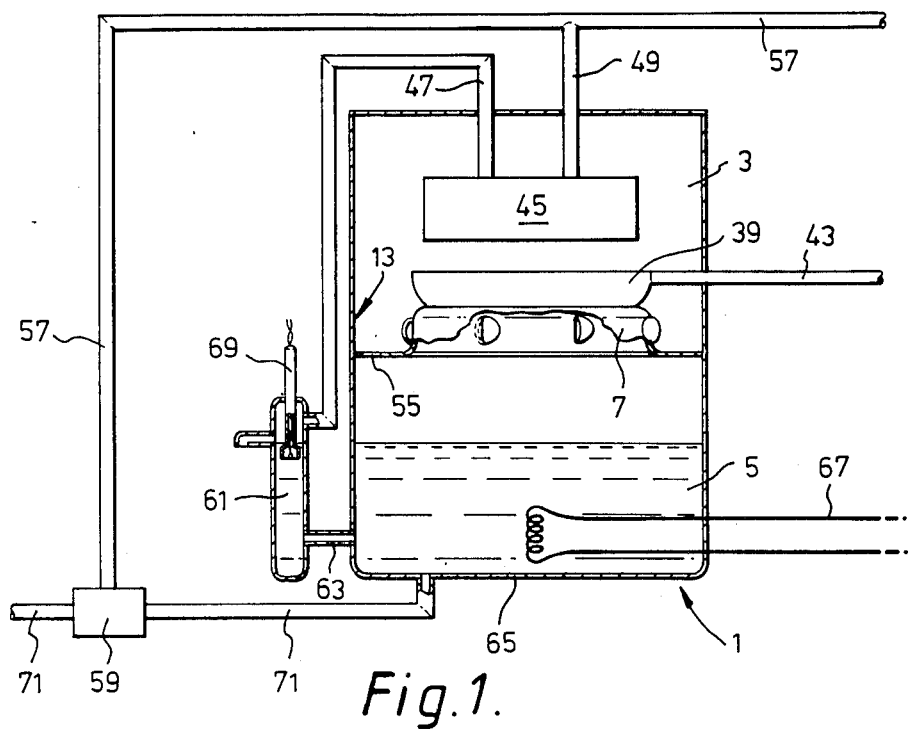
Figure 2:
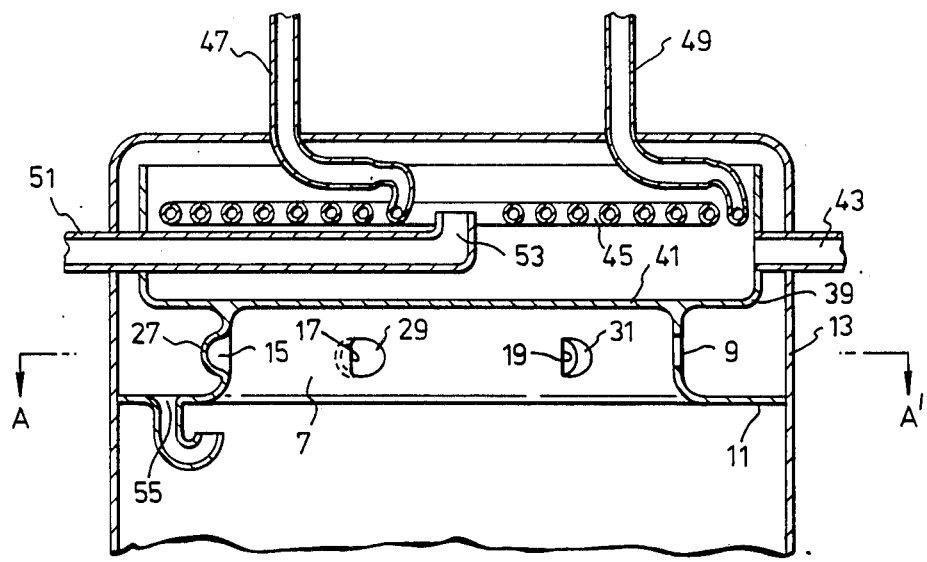
FIG. 2 is a diagrammatic partial vertical section through a still according to the invention, showing a condenser assembly and a means for removing droplets from vapour.
Figure 3:
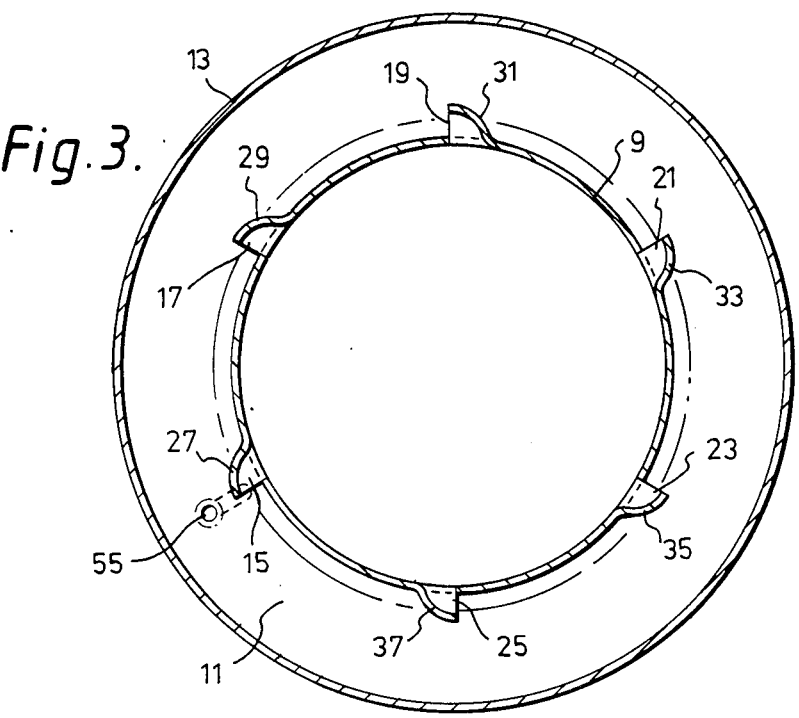
FIG. 3 is a horizontal section along the line A-A' in FIG. 2.

Referring first to FIG. 1, a water still 1 according to the invention comprises a condenser assembly 3 located above and communicating with a boiler assembly 5, by means for removing droplets from vapour in the form of a cyclone assembly 7. Turning particularly to FIGS. 2 and 3, the cyclone assembly 7 comprises a horizontal annulus 9, provided at a lower end portion with a peripheral outer flange 11. The flange 11 is attached to a side wall 13 of the still 1. Tangential jets 15, 17, 19, 21, 23 and 25 are radially disposed about the annulus 9 at 60° intervals.

Each jet 15, 17, 19, 21, 23 and 25 includes an arcuate portion, 27, 29, 31, 33, 35 and 37 respectively, so that the jets 15, 17, 19, 21, 23 and 25 direct tangentially to the annulus 9 in an anticlockwise fashion, viewed from above. The jets may, of course, direct tangentially in a clockwise fashion. The jets may also be formed in the annulus by annealing L shaped conduits on to perforations in the annulus. In a further alternative form, the jets may be provided with an arcuate, inward facing portion of the annulus. Immediately above the annulus 9 is a distillate receiver 39. A bottom surface 41 of the receiver 39 caps the annulus 9. The receiver 39 is provided in an upper portion with a drainage port 43. Above the receiver 39 is a condenser in the form of a horizontal spiral conduit 45. The innermost end of the spiral conduit 45 communicates with a condenser outlet 47 and the outermost end of the spiral conduit is provided with a condenser inlet 49.

An alternative condenser coil that can be envisaged is a condenser coil in the form of a horizontal helix, e.g. a "hammer-head" condenser.

At the innermost end of the spiral conduit 45, and adjacent the condenser outlet 47 is a gas vent in the form of an elongate conduit 51 communicating with the outside of the still, and provided at the innermost end of the spiral connduit 45 with an upwardly facing aperture 53.

The flange 11 is provided with an outlet 55, which permits the return of droplets separated by the cyclone assembly 7 to the boiler assembly 5. Referring particularly to FIG. 1, the condenser inlet 49 communicates with an inlet conduit 57, which communicates with a pressure actuated valve 59. The condenser outlet 47 communicates with a constant level device in the form of a weir 61, connected to the boiler by means of a boiler inlet 63.

The boiler assembly 5 includes a boiler 65 provided with a heating element 67, a means for detecting a fall in the water level of the boiler in the form of a thermistor assembly 69, and a boiler outlet 71 controlled by the pressure actuated valve 59.

In operation, water boiled in the boiler assembly 5 evaporates to give water vapour containing entrained droplets. By vapour we mean a gas/liquid water mixture. The vapour passes through the tangential jets 15, 17, 19, 21, 23 and 25, towards the condenser assembly 3. In doing so, droplets entrained in the vapour are caused to undergo an outwardly spiralling motion and impinge on the side wall 13 of the still 1, which acts as a deflecting surface. The separated droplets run down the wall 13 and return to the still via the separator outlet 55. The vapour, on passing through the cyclone assembly 7 is principally in the form of steam.

Steam impinges on the condenser coil 45, through which cooling water is flowing, forming droplets of water. Because of the configuration of the coil 45 these fall directly into the distillate receiver 39, and do not run down or fall onto any other cooler part of the coil 45. Carbon dioxide rich steam surrounding the coil is allowed to escape via the gas vent 51. The distillate collected in the receiver 39 is heated by the vapour passing through the cyclone assembly 7, ensuring that reabsorbtion of carbon dioxide is kept to a minimum.

The hot distillate flows through the drainage port 43 for collection.

The water still according to the still is advantageous because it is capable of producing distilled water more economically and/or of lower conductivity than known stills.

Figure 4:
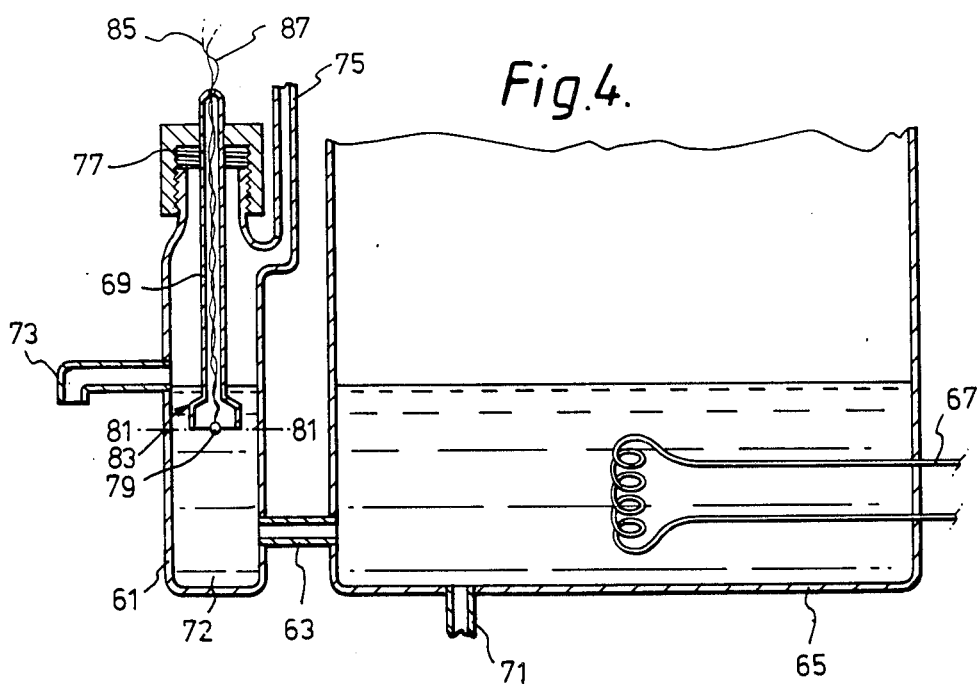
FIG. 4 is a diagrammatic partial vertical section through the boiler assembly of a still according to the invention, including a thermistor assembly.

The constant level device 61, which is attached to the boiler assembly 5 and is shown in more detail in FIG. 4, comprises a cylindrical vessel 72 attached at a lower end portion to the boiler inlet 63 of the boiler assembly 5. The constant level device 61, which is conventional in design, is provided towards the upper end portion with a downward venting side arm 73, which determines the upper level of water maintained in the boiler assembly. Water is fed into the constant level device 61 and so into the boiler 65 by means of a tube 75 connected to the condenser outlet 47. The upper end portion of the constant level device 61 terminates in a screw thread, and is surmounted by an adjustable screw cap 77, in which the thermistor assembly 69 is centrally mounted.

The thermistor assembly 69 comprises at the lower, probe end, a thermistor 79, positioned at a predetermined low water level 81, below which water should not fall. The thermistor 79 is protected by a skirt 83, preferably made of glass, mounted concentrically on the lower end portion of the thermistor assembly 69. The thermistor 79 is provided with connecting wires 85, 87 which communicate with an appropriate detecting circuit and power supply (not shown). In operation, the upper level of water in the boiler 65 is regulated by the position of the side arm 73 in the constant level device 61, and the thermistor 79 is immersed in water. This allows the thermistor 79 to stabilise at a temperature below its transition temperature.

If the water level falls below the low water level 81, the thermistor 79 is no longer immersed in water, and because of the difference in heat conductivity between the air or water vapour and the liquid water the temperature of the thermistor 79 rises to a value approaching its transition temperature, and its resistance increases accordingly. The corresponding decrease in electric current flowing through the thermistor 79 can be detected by conventional means, eg by measuring the voltage change across a resistor in series with the thermistor 79. The resulting change can be used to instruct the heating element 67 to turn off, or more water to be fed to the boiler 65 by the inlet 75.

Alternative forms of pressure actuated valve 59 are shown in FIGS. 5 and 6. Referring to FIG. 5, a pressure actuated valve according to the invention comprises a flexibly resilient conduit in the form of a flexible tubular portion 89 of the boiler outlet 71, concentrically surrounded by a rigid envelope in the form of a cylinder 91. The cylinder 91 is provided at each end with screw caps 93, 95 which form a sealing engagement with the rigid portions 97, 99 of the boiler outlet 71. The cylinder 91 is provided with a side arm 101 which communicates with the inlet conduit 57.

In operation, the greater pressure of water flowing through the inlet conduit 57 than in the outlet 71 causes the flexible portion 89 to collapse, as shown by the dotted lines, thus sealing the boiler outlet 71. The pressure in the boiler outlet 71 is determined by the water level in boiler 65. Failure of the water supply to the inlet conduit 57 results in a loss of pressure to the cylinder 91. When the pressure in the outlet 71 exceeds that communicated to the cylinder 91, the flexible portion 89 opens, and the contents of the boiler 65 are discharged via the boiler outlet 71.

In FIG. 6, a pressure actuated valve is shown in which water pressure acts indirectly, by means of an expansible member. Referring to FIG. 6, the valve 59 comprises a rigid cylinder 103 surrounding a flexible portion 105 of the boiler outlet 71. The cylinder 103 is provided with a side arm 107, in which is screw mounted a gate assembly 109. The gate assembly 109 comprises a cylindrical sleeve 111 enclosing a piston 113 carrying a plunger head 115 which bears against the flexible portion 105 of the outlet 71. The piston 113 is biased by a compression spring 117 away from the flexible tube portion 105. The upper end portion of the sleeve 111 is provided with a rolling diaphragm 119 which extends over the upper end portion of the piston 113. The gate assembly 109 is provided with a water inlet 121, at the upper end of the cylinder 111 above the diaphragm 119, which communicates with the water inlet conduit 57.

Water flowing through the inlet conduit 57 causes the rolling diaphragm 119 to expand against the piston 113, and force the plunger head 115 against the flexible tube portion 105, as shown by the dotted line, closing the boiler outlet 71.

When the pressure in outlet 71 exceeds the pressure in inlet 57, the tube 105 opens, and the contents of the boiler 65 are discharged via outlet 71.

The valves are particularly advantageous in that they are readily serviced, cheap and reliable.

They find particular application in preventing the build up of scale components in water stills, since whenever feed water to the still is turned off, or fails, the boiler is emptied automatically by the valve.

We claim:

1. In an enclosed, walled water still for providing distilled water and having a lower water boiler chamber and an upper condensor chamber with a condensor coil, the improvement of providing distilled water with low conductivity, said improvement comprising:
    a cyclone liquid/vapor separator in the form of a capped annulus mounted between the water still walls and intermediate the lower water boiler chamber and the upper condensor chamber for removing droplets from vapor,
    the capped annulus having a plurality of jets for imparting a spiralling motion to droplets and vapor entering said annulus from the water boiler and urging the droplets to impinge on an interposed deflecting surface;
    a distillate receiver integrally formed on top of said cyclone liquid/vapor separator with the receiver bottom formed integrally with the top of said capped annulus and with the condensor coil mounted above the distillate receiver; and
    means enabling the vapor separated from the droplets to impinge on the condensor coil to form water collected in the bottom of the distillate receiver.

2. A still according to claim 1, wherein the deflecting surface is a side wall of the still.

3. A still according to claim 1, wherein the jets are capable of urging droplets in a direction tangential to the circle.

4. A still according to claim 1, wherein each jet includes an arcuate portion.

5. A still according to claim 1, wherein the drainage port is located in an upper portion of the distillate receiver.

6. A still according to claim 1, wherein the condenser coil is arranged so that water which has condensed on to one portion of the condenser cannot flow to any other cooler portion of the condenser.

7. A still according to claim 6, wherein the condenser comprises a horizontal spiral conduit.

8. A still according to claim 1, wherein the condenser assembly is provided with a gas vent comprising an elongate conduit provided with an upwardly facing aperture within the still for removing gases from the condensor assembly.

9. A still according to claim 8, wherein the aperture is located adjacent the portion of the condenser coil, which in operation is the hottest portion of the coil.

10. An enclosed, walled water still providing distilled water with low conductivity, said water still comprising:
    a water boiler assembly in the lower portion of said enclosed, walled water still forming water vapor containing entrained droplets;

a unitary formed cyclone liquid/vapor separator portion and distillate receiver portion, including a distillate receiver tank with an outlet for collected distilled water, a skirt section depending from the bottom of the receiver tank, and said skirt section flaring outwardly to form a peripheral flange mounted to said enclosure walls above the water boiler assembly so that the interior of said skirt section and the bottom of the receiver tank communicates with the water vapor formed in the boiler, and the collected distilled water in the receiver tank is heated by said water vapor;

a plurality of jets formed around said skirt section for imparting a spiralling motion to droplets and water vapor entering the interior of said skirt section from the water boiler and urging the droplets to impinge on an interposed deflecting surface;

a condensing assembly including a condensor coil in the upper portion of said enclosed, walled water still, the condensor coil mounted in vertical position with respect to the receiver tank so that the vapor separated from the droplets impinges on the condensor coil to form water collected in the bottom of the receiver tank which may be removed via said outlet; and a gas vent including an elongate conduit with an upwardly facing aperture, and means for mounting said aperture adjacent the condensor portion which in operation is the hottest portion of the condensor for removing gases from the condensor assembly.

* * * * *